US008815006B2

(12) United States Patent
Damani et al.

(10) Patent No.: US 8,815,006 B2
(45) Date of Patent: Aug. 26, 2014

(54) METHOD FOR COATING A SUBSTRATE AND SUBSTRATE WITH A COATING

(76) Inventors: Rajiv J. Damani, Winterthur (CH); Malko Gindrat, Wohlen (CH)

( * ) Notice: Subject to any disclaimer, the term of this patent is extended or adjusted under 35 U.S.C. 154(b) by 146 days.

(21) Appl. No.: 13/266,727

(22) PCT Filed: May 7, 2010

(86) PCT No.: PCT/EP2010/056276
§ 371 (c)(1),
(2), (4) Date: Jan. 23, 2012

(87) PCT Pub. No.: WO2010/128147
PCT Pub. Date: Nov. 11, 2010

(65) Prior Publication Data
US 2012/0132106 A1 May 31, 2012

(30) Foreign Application Priority Data
May 8, 2009 (EP) .................................. 09159805

(51) Int. Cl.
*C09D 1/00* (2006.01)
(52) U.S. Cl.
USPC .................. 106/286.2; 106/286.1; 106/286.5; 106/286.6
(58) Field of Classification Search
USPC ....................... 106/286.1, 286.2, 286.5, 286.6
See application file for complete search history.

(56) References Cited

U.S. PATENT DOCUMENTS

| 5,853,815 | A | 12/1998 | Muehlberger |
| 6,071,324 | A | 6/2000 | Laul et al. |
| 6,254,704 | B1* | 7/2001 | Laul et al. ..................... 148/513 |
| 2005/0129965 | A1* | 6/2005 | Barbezat et al. ............. 428/469 |
| 2007/0199629 | A1* | 8/2007 | James et al. .................. 148/428 |
| 2008/0226837 | A1 | 9/2008 | Damani et al. |
| 2009/0136781 | A1 | 5/2009 | Damani et al. |

FOREIGN PATENT DOCUMENTS

| EP | 0960954 | A | 12/1999 |
| EP | 1911858 | A | 4/2008 |
| EP | 2025772 | A | 2/2009 |
| WO | 03/087422 | A | 10/2003 |

OTHER PUBLICATIONS

International Search Report for PCT/EP2010/056276 dated Jun. 6, 2010.

\* cited by examiner

*Primary Examiner* — James McDonough
(74) *Attorney, Agent, or Firm* — Robert S. Green

(57) ABSTRACT

A method for the coating of a substrate in which a starting material (P) is sprayed onto the substrate in the form of a process jet by means of plasma spraying, with the starting material (P) being injected into a plasma which defocuses the process jet and being melted partly or completely into a liquid phase there at a low process pressure which is at most 20,000 Pa, wherein a gas flow for the process jet is set such that the substrate is coated by deposition from the liquid phase in at least one region which is located in the geometric shadow with respect to the process jet.

20 Claims, 3 Drawing Sheets

METHOD FOR COATING A SUBSTRATE AND SUBSTRATE WITH A COATING

CROSS-REFERENCE TO RELATED APPLICATIONS

Figure 1:
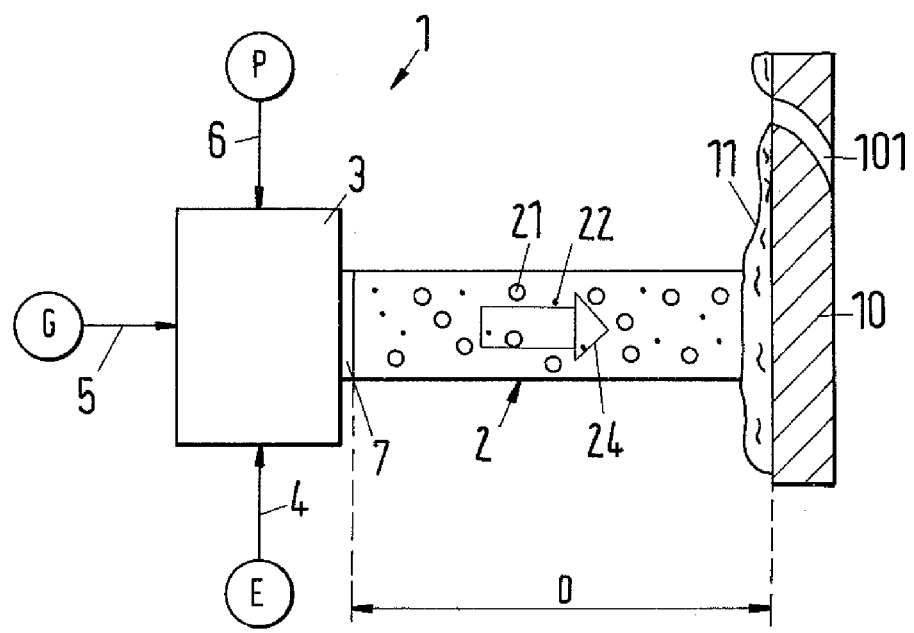

The present application claims priority under 35 U.S.C. §119 of European Patent Application No. 09159805.2 filed on May 8, 2009, and is a 371 nationalization of PCT/EP2010/056276, the disclosures of which is expressly incorporated by reference herein in their entirety.

The invention relates to a method for the coating of a substrate and to a substrate having a coating in accordance with the preamble of the independent claims of the respective category.

Thermal spraying methods have proven themselves to deposit coatings, for example corrosion protection layers or erosion protection layers, on substrates. In particular also metal or carbide materials are used for them to produce a metal layer or a hard metal layer or a carbide layer on the substrate. Atmospheric plasma spraying (APS) processes or high velocity oxy fuel (HVOF) processes are in particular typically used successfully for the hard metal layers or carbide layers today.

A restriction of these methods can be seen in the fact that coating can only take place in the direct line of sight with them; that means inner or hidden surfaces of the substrate to be coated, which are located in the geometric shadow region of the process jet, can generally not be coated.

It is therefore an object of the invention to provide a method for the coating of a substrate with which such surfaces of a substrate can also be coated which are not located in the direct line of sight of the process jet. This method should in particular be suitable for the generation of hard metal layers or carbide layers on metal substrates. Furthermore, a substrate coated in this manner should be proposed by the invention.

The subjects of the invention satisfying this object are characterized by the independent claims of the respective category.

In accordance with the invention, a method is therefore proposed for the coating of a substrate in which a starting material is sprayed onto the substrate in the form of a process jet by means of plasma spraying, with the starting material being injected into a plasma which defocuses the process jet and being melted partly or completely into a liquid phase or plasticized phase there at a low process pressure which is at most 20,000 Pa, wherein the starting material P contains a metallic matrix or a metal alloy, the temperature of the starting material P in the process jet is lower than the boiling temperature of the metallic matric or of the metal alloy, and wherein a gas flow for the process jet is set such that the substrate is coated by deposition from the liquid phase or plasticized phase in at least one region which is located in the geometric shadow with respect to the process jet.

This method is a specific plasma spraying method which is described generically in WO-A-03/087422 or also in U.S. Pat. No. 5,853,815, namely a thermal spraying for the manufacture of a so-called LPPS (low pressure plasma spraying) thin film.

It is specifically an LPPS thin film (LPPS-TF) process. In this, a conventional LPPS plasma spraying method is modified in a technical process manner, with a space through which a plasma flows ("plasma flame" or "plasma jet") being widened due to the changes and being expanded to a length of up to 2.5 m. The geometric extent of the plasma results in a uniform expansion—a "defocusing"—of the process jet which is injected into the plasma by a carrier gas. The material of the process jet which is dispersed to form a cloud in the plasma and is melted partly or completely or at least plasticized there reaches the surface of a substrate in a uniform distribution.

The recognition is now important for the invention that, for a metallic matrix or for a metal alloy in the starting material, the gas flow for the process jet can be set such that a deposition can also be achieved from the liquid phase in such regions which are in the geometric shadow with respect to the process jet. It is thus possible also to deposit material from the liquid phase of the process jet in hidden or inner regions which are not in the direct line of sight (non-line of sight) of the process jet. It is important here to set the energy content of the plasma so that the temperature of the metallic starting material in the process jet is lower than the boiling temperature of the metallic matrix or of the metal alloy. The metallic component should only be plasticized or melted, a vaporization of the metallic component should be—at least largely—avoided. The particle temperature of the starting material should not exceed 90%, preferably 80% and in particular 70% of the boiling temperature of the metal matrix or metal alloy.

A further parameter which influences the particle temperature of the starting material in the process jet in addition to the energy content of the plasma is the supply rate at which the starting material is conveyed into the plasma. At a high supply rate, the dwell time of the starting material in the plasma flame is much smaller so that the heat input into the particles of the starting material is also smaller on average so that it can also be ensured via the supply rate that the temperature of the starting material in the process jet is lower than the boiling temperature of the metallic matrix or metal alloy. It can also hereby be avoided that the metallic component is vaporized. In practice, it is the combination of the plasma parameters with the supply rate via which the particle temperature is set.

The supply angle at which the starting material is introduced into the process jet also influences the particle temperature of the starting material in the process jet. It is generally customary that the starting material within the discharge nozzle is injected into the process jet. In this respect, the starting material can be introduced into the process jet either perpendicular to the flow direction of the process jet—that is radially—or the starting material is injected obliquely to the flow direction of the process jet. In this case, there are the two variants "upstream" and "downstream". In the upstream injection, the starting material is injected obliquely and against the flow direction of the process jet; in the downstream injection, the starting material in introduced obliquely in the direction of the flow direction of the process jet. In the upstream injection, a higher heat input into the starting material results because the dwell time in the plasma, and in particular in the high-energy region in the discharge nozzle, is longer than in the downstream injection. A downstream injection is therefore preferred for the method in accordance with the invention because it is more advantageous with respect to the avoidance of a substantial vapor phase of the metallic component. The process pressure is preferably at least 50 Pa and at most 10,000 Pa.

It has been found that the coating of the hidden regions is particularly successful when the gas flow for the process jet has a total flow rate from 50 to 200 SLPM (standard liters per minute).

It is favorable with respect to the distance if the spraying distance between a discharge nozzle for the process jet and the substrate is between 50 mm and 1500 mm, preferably amounts to more than 400 mm and is particularly preferably between 700 mm and 1000 mm.

It is preferred with respect to the powder supply if a supply rate is selected for The method in accordance with the invention is suitable for manufacturing a corrosion protection layer or an erosion protection layer on the substrate.

A metal layer, a hard metal layer or a carbide layer is preferably manufactured with the method in accordance with the invention.

In a preferred embodiment, the starting material is a metal alloy of the type MCrAlX, where M stands for Nickel (Ni) and/or cobalt (Co) and/or iron (Fe) and X stands for yttrium (Y) and/or zirconium (Zr) and/or hafnium (Hf). Yttrium is particularly preferably used for X with these MCrAlX compounds. Very good corrosion protection layers can be produced with these compounds. In accordance with the invention, these MCrAlX compounds can now also be produced from the liquid phase in the geometric shadow of the process jet.

The method in accordance with the invention is specifically also suitable when a layer is manufactured on the substrate which contains tungsten carbide or chromium carbide as well as nickel-chromium or cobalt-chromium.

Another preferred variant is when a nickel-chromium layer or a nickel-chromium carbide layer is manufactured on the substrate.

The starting material is preferably a spraying powder including particles of which each substantially comprises two metals and carbon, with the first metal including a portion which is alloyed with the second metal and a further portion which forms a carbide with the carbon.

In this respect, the first metal is preferably chromium, the second preferably nickel, and the carbide is distributed uniformly in the metallic matrix in the form of precipitations.

The starting material P is preferably a spray powder which includes particles whose size amounts to 5 to 50 micrometers, in particular 10 to 20 micrometers. This size has proven itself for preventing a disintegration of the individual particles into smaller particles. In addition, it can be prevented with this particle size in the event of the carbides that a thermal degradation of the carbides takes place.

The method is in particular suitable when the substrate is the rotor of a rotary machine, in particular of a pump.

A substrate is furthermore provided by the invention having a coating which is manufactured by means of plasma spraying, with a starting material being sprayed onto the substrate in the form of a process jet, with the starting material being injected into a plasma which defocuses the process jet and being melted partly or completely there in a liquid or plasticized phase at a low process pressure which is at most 20,000 Pa, with the starting material P containing a metallic matrix or a metal alloy, the temperature of the starting material P in the process jet 2 being smaller than the boiling temperature of the metallic matrix or metal alloy and with the coating being manufactured by deposition from the liquid or plasticized phase and being provided at least in a region which is located in the geometric shadow with respect to the process jet.

The coating is a hard metal coating or a carbide coating in a preferred embodiment.

Further advantageous measures and preferred embodiments of the invention result from the dependent claims.

Figure 2:
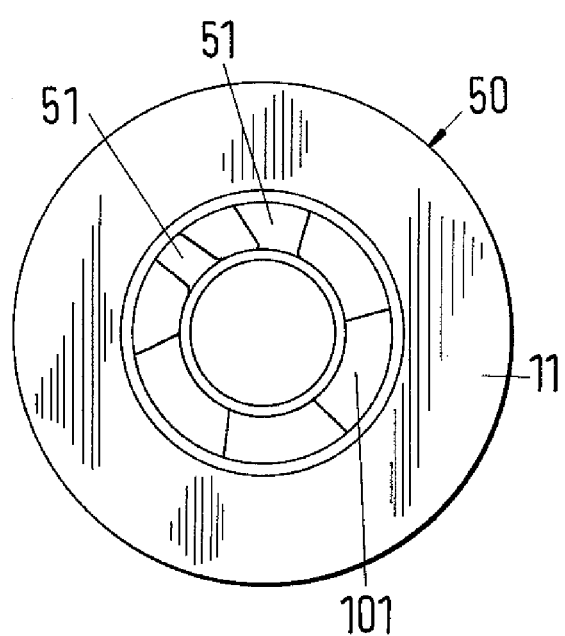
Figure 3:
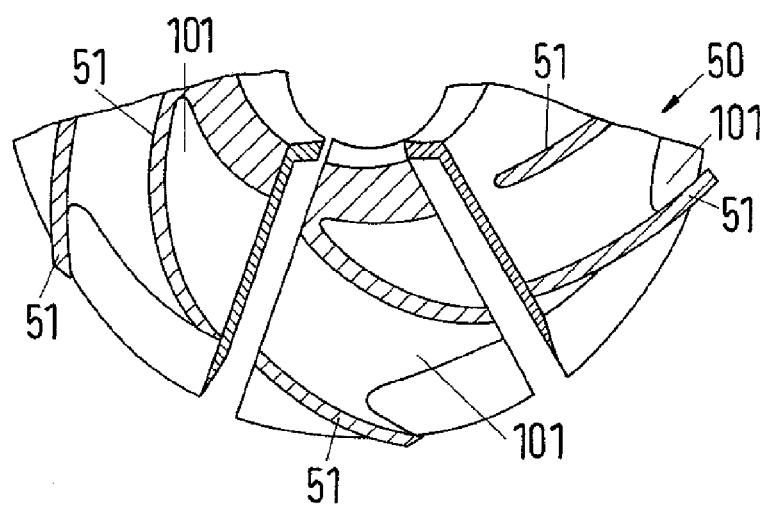

The invention will be explained in more detail in the following with reference to embodiments and to the drawing. There are shown in the schematic drawing, partly in section:

FIG. 1 a schematic representation of an apparatus for the carrying out of a method in accordance with the invention;

FIG. 2 a plan view of the rotor of a pump which is coated using a method in accordance with the invention; and FIG. 3 a schematic sectional representation of a part of the upper half (cover) of the rotor of FIG. 2.

The method in accordance with the invention for the coating of a substrate is carried out by means of a plasma spraying apparatus which includes a process chamber which can be evacuated.

FIG. 1 shows, in a very schematic representation, a plasma spraying apparatus which is designated as a whole by the reference numeral 1 and which is suitable for the carrying out of a method in accordance with the invention. In addition, a substrate 10 is shown schematically in FIG. 1 on which a layer 11 is deposited.

The method in accordance with the invention preferably includes plasma spraying which is generically described in WO-A-03/087422 or also in U.S. Pat. No. 5,853,815. This plasma spraying method is a thermal spraying for the manufacture of a so-called LPPS (low pressure plasma spraying) thin film.

An LPPS thin film (LPPS-TF) process is specifically carried out using the plasma spraying apparatus shown in FIG. 1. In this, a conventional LPPS plasma spraying method is modified in a technical process manner, with a space through which a plasma flows ("plasma flame" or "plasma jet") being widened due to the changes and being expanded to a length of up to 2.5 m. The geometric extent of the plasma results in a uniform expansion—a "defocusing"—of a process jet which is injected into the plasma by a carrier gas. The material of the process jet which is dispersed to form a cloud in the plasma and is melted partly or completely there reaches the surface of a substrate 10 in a uniform distribution.

The plasma spraying apparatus 1 shown in FIG. 1 includes a plasma generator 3 known per se having a plasma torch, not shown in any more detail, for the generation of a plasma. A process jet 2 is generated in a manner known per se using the plasma generator 3 from a starting material P, a process gas mixture G and electrical energy E. The feeding of these components E, G and P is symbolized by the arrows 4, 5, 6 in FIG. 1. The generated process jet 2 is discharged through a discharge nozzle 7 and transports the starting material P in the form of the process jet 2 in which coating material 21, 22 is dispersed in a plasma. This transport is symbolized by the arrow 24. It should be indicated by the different reference numerals 21, 22 that the coating material can—but does not have to—be present in a plurality of phases. At least one liquid phase 21 is present. Furthermore, a solid and/or a gaseous phase 22 can be contained in the process jet 2. The morphology of the layer 11 deposited on the substrate 10 is dependent on the process parameters and in particular on the starting material P, the process enthalpy and the temperature of the substrate 10. The process chamber which can be evacuated is not shown in FIG. 1.

In the LPPS-TF process described here, the starting material P is injected into a plasma which defocuses the process jet at a low process pressure which is at most 20,000 Pa and preferably at most 10,000 Pa and is partly or completely melted therein so that the liquid phase 21 arises. For this purpose, a plasma with a sufficiently high specific enthalpy is generated so that a very dense layer 11 arises on the substrate. The structure of the layer, such as its texture, is substantially influenced and controllable by the coating conditions, in particular by the process enthalpy, the working pressure in the process chamber and the process jet. The process jet 2 thus has properties which are determined by controllable process parameters.

As is indicated in FIG. 1, the substrate 10 has at least one region 101 which is located in the geometric shadow with respect to the process jet 2. This region can, for example, be a hidden region 101 or an inner surface of the substrate. Those geometric shadow regions or hidden or covered regions are meant by the geometric shadow regions 101 or hidden or covered regions 101 which cannot be acted on directly—in the geometric sense—by the process jet 2 in the plasma spraying (non-line of sight). It is frequently the case that such regions 101 can also not be reached by a rotation of the substrate 10 in the process jet 2 or by another relative movement between the process jet 2 and the substrate 10.

In accordance with the invention, the gas flow for the process jet 2 is now set so that the substrate 10 is coated by deposition from the liquid phase 21 in at least one of the regions 101 which is located in the geometric shadow with respect to the process jet. The recognition is important and surprising in this respect that it is also possible to achieve deposits from the liquid phase 21 in the geometric shadow region of the process jet 2.

The generation of the layer 11 by means of LPPS-TF will now be explained in more detail.

A powder of suitable composition, such as will be explained further below, is selected as the starting material P. This powder contains a metallic matrix or a metal alloy, preferably a metal alloy of the type MCrAlX, where M stands for nickel (Ni) and/or cobalt (Co) and/or iron (Fe) and X stands for yttrium (Y) and/or zirconium (Zr) and/or hafnium (Hf). In this respect, it is a possibility that the starting material P is present in the form of a single powder. Another possibility is to use two or more different powdery materials as the starting material which can be present as a powder mixture or which are injected into the plasma flame simultaneously via two different powder supplies or also after one another in time.

As already mentioned, in the LPPS-TF process, the plasma flame is very long in comparison with conventional plasma spraying processes due to the set process parameters. In addition, the plasma flame is greatly widened. A plasma with a high specific enthalpy of, for example, up to 15,000 kJ/kg is generated, whereby a high plasma temperature results. A very high energy input into the coating material 21, 22 arises due to the high enthalpy and the length or the size of the plasma flame and said coating material is thereby greatly accelerated, on the one hand, and brought to a high temperature, on the other hand, so that it can melt very well or be plasticized.

It is important in this respect, however, that the plasma temperature and the supply rate of the powder are matched to one another so that the temperature of the particles of the starting material P in the process jet 2 is lower than the boiling temperature of the metallic matrix or metal alloy since a vaporization of the metallic component should be prevented.

The plasma is, for example, generated in a plasma torch known per se in the plasma generator 3 with an electric DC current and by means of a cathode or a plurality of cathodes as well as an annular anode. The power supplied to the plasma, the effective power, can be determined empirically. The effective power which is provided by the difference between the electrical power and the heat led off by cooling is e.g. in the range from up to 80 kW, experience has shown. It has proven of value for this purpose if the total power of the system is between 20 and 200 kW.

The current for the generation of the plasma preferably amounts to 2000 to 2600 A.

A value is selected for the process pressure of the LPPS-TF plasma spraying in the process chamber between 50 and 2000 Pa, preferably between 100 and 1000 Pa and specifically in the range of 150 Pa.

The starting material P is projected into the plasma as a powder jet using a carrier gas, preferably argon, helium, hydrogen or a mixture of at least two of these gases. The flow rate of the carrier gas preferably amounts to 5 to 40 SLPM (standard liters per minute).

The particle size in the starting material P is preferably between 5 and 50 micrometers, with the range from 10 to 20 micrometers being particularly preferred.

The process gas, that is the gas for the process jet 2 for the generation of the plasma, is preferably a mixture of inert gases, in particular a mixture of Argon Ar, hydrogen H and helium He. In practice, the following gas flow rates for the process gas have particularly proven themselves:

Ar flow rate: 50 to 120 SLPM
$H_2$ flow rate: Zero to 12 SLPM
He flow rate: Zero to 40 SLPM, where the total flow rate of the process gas preferably amounts to less than 200 SLPM and to at least 50 SLPM.

The supply rate at which the starting material P is conveyed is in particular at most 160 g/min and at least 20 g/min, preferably between 40 and 80 g/min. In a configuration with two or more injectors for the powder supply, these rates are preferably evenly distributed over all injectors, i.e. with two injectors, work is preferably carried out at a powder supply rate per injector of 20 g/min to 40 g/min so that a supply rate overall of 2×20 g/min to 2×40 g/min results.

It can be advantageous if the substrate is moved by rotational or pivotal movements relative to the process jet during the material application. It is naturally also possible to move the plasma generator 3 relative to the substrate 10.

The spraying distance, that is the distance D between the discharge nozzle 7 and the substrate 10, preferably amounts to 50 to 1500 mm, in particular more than 400 mm and specifically 700 to 1000 mm.

The method in accordance with the invention is in particular suitable for the manufacture of metal corrosion protection layers or erosion protection layers.

The method in accordance with the invention is specifically suitable for the manufacture of hard metal layers or carbide layers is in particular on substrates with internal or hidden regions 101. For this purpose, in particular a powder is suitable as the starting material P such as is described in the European patent application EP-A-0 960 954.

This thermal spraying powder includes particles of which each substantially comprises nickel, chromium and carbon, with the chromium including a first portion which forms an alloy with the nickel which forms a matrix as well as a second portion which forms a carbide with the carbon which is distributed uniformly in the matrix in the form of deposits.

Other metals are naturally also suitable for such hard metal coatings or carbide coatings, for example tungsten carbide. In addition to the already mentioned nickel-chromium matrix, the tungsten carbide or the chromium carbide can also be embedded in a cobalt-chromium matrix.

It is understood that metal alloys without carbides can also be used for the manufacture of corrosion resistant layers, for example nickel-chromium alloys or also metals such as zinc.

An example will be given in the following in which the rotor of a rotary machine, specifically the rotor of a pump, is provided with a hard metal coating.

FIG. 2 shows a plan view of the already coated rotor of a pump which is designated as a whole with the reference numeral 50 and which includes a plurality of vanes 51 made in curved form. Hidden regions 101 thus arise between these vanes 51 which are located in the geometric shadow region of the process jet 2 in the coating process.

FIG. 3 shows a schematic sectional representation of a part of the half (cover) of the rotor of FIG. 2 at the top in accordance with the representation. The section is made perpendicular to the axis about which the rotor rotates. In FIG. 3, three different regions 101 are marked by way of example, which represent inner surfaces or hidden regions which are located in the geometric shadow region of the process jet 2 during the coating.

After the substrate 10, here that is the rotor 50 of a pump, was prepared for the coating in a manner known per se, for example by cleaning, sandblasting or shot-peening, ionic cleaning, etc. of its surface, it is introduced into the process chamber and fixed on a movable holder, for example a rotatable holder. An additional ionic cleaning can take place in a manner known per se in the process chamber by means of the plasma source and a preheating of the rotor before the actual coating process starts. The preheating of the substrate 10 serves to achieve a better bond between the coating and the substrate.

The spraying distance between the discharge nozzle 7 is selected in dependence on the process pressure in the process chamber since both the length and the diameter of the process jet 2 are a function of the process pressure. In the present example, the process pressure is 150 Pa and the spraying distance D amounts to 700 mm. It is hereby possible to cover a large surface with the wide plasma flame and to force the plasma flow or the process jet 2 to pass through the complex geometry of the rotor.

The plasma torch is arranged on an axle so that it is movable relative to the substrate 10. The total substrate 10 can thereby be heated in a controlled manner by the plasma and the process jet 2 can sweep over the total rotor 50 during the coating. In this manner, the thickness and the quality of the deposited coating can also be monitored.

The preheating of the rotor 50 by means of the plasma can take place, for example, with the same plasma parameters as the subsequent coating. The plasma flame is moved over the total rotor 50 a number of times for the preheating and said rotor is rotated in this process to ensure a uniform heating. The rotor 50 is typically preheated to a temperature between 300 K and 500 K.

NiCr—CrC (nickel-chromium chromium carbide) is selected as the coating material. The starting material P is in this respect the already mentioned powder which is disclosed in EP-A-0 960 954, namely a thermal spraying powder in which each particle substantially comprises nickel (Ni), chromium (Cr) and carbon C, with a first portion of the chromium forming an alloy with the nickel which forms a matrix and with the second portion of the chromium forming one or more chromium carbides (e.g. $Cr_3C_2$ or $Cr_7C_3$) with the carbon which are distributed substantially uniformly in the NiCr matrix in the form of deposits. The typical size of the deposits amounts to 0.1 μm to 5 μm. The starting material P is introduced in a manner known per se into the plasma by means of two powder carriers and a carrier gas, here argon.

A mixture of argon (Ar) and hydrogen ($H_2$) is used for the process gas with which the plasma or the process jet 2 are generated, with the gas flow rates amounting to 60 SLPM for Ar and 12 SLPM for $H_2$. The plasma is generated with a current of 2400 A from which a voltage of 43.75 V results. The total power then amounts to 105 kW. The plasma torch is water cooled and a portion of the power is output to the cooling system. A reduced power therefore results for the plasma flame which amounts to approximately 45% to 55% of the total power. The injection of the powdery starting material P takes place directly into the plasma flame, that is into the region of high enthalpy. The two powder carriers are disposed opposite one another. The supply rate at which the starting material is introduced into the plasma amounts to 2×30 g/min, that is to a total of 60 g/min. A flow rate of 2×5 SLPM is set for the carrier gas, argon here. The coating time amounts to between 2 and 10 minutes.

After the coating, the rotor 50 is cooled, which can be done, for example, in a different chamber to the process chamber. This chamber in which the rotor 50 cools down is preferably filled to a presettable pressure with an inert gas, in particular argon. The cooling time and the pressure are selected in dependence on the type of the substrate 10 and on the type of the applied coating so that inner strains and cracks during the cooling are avoided. In the present example, a cooling time of 10 minutes at a pressure of 50,000 Pa argon is selected.

Coatings generated in this manner, such as in the present example from atomized NiCr—CrC starting material, typically have a microhardness of Hv(0.3)=900 to 950.

The method in accordance with the invention is therefore in particular suitable for the manufacture of metal erosion protection layers or corrosion protection layers, such as hard metal layers or carbide layers, on substrates which have inner or hidden surfaces which are not located in the line of sight of the process jet, but rather in its geometric shadow region.

The method in accordance with the invention is furthermore suitable for depositing such layers of MCrAlX, where X is particularly preferably yttrium.

In addition to the already mentioned rotor 50 of a pump, these can, for example, also be turbine parts. A turbine, for example a steam turbine, a stationary gas turbine or an airplane engine usually includes a plurality of rotating rotors and stationary guide elements. Both the rotors and the guide elements each include a plurality of turbine vanes. The turbine vanes can each be mounted at their foot to a common axle of the turbine or they can be provided in the form of segments which each include a plurality of turbine vanes. This design is frequently called a cluster vane segment or, depending on the number of turbine vanes, as a double vane segment, a triple vane segment, etc.

The method in accordance with the invention can in particular also be used advantageously with the cluster vane segments because coating can also be done in shadow regions with these methods. With cluster vane elements, there are geometric shadow regions or hidden or covered regions which cannot be acted on directly—in the geometric sense—by the process jet. It is frequently the case that such regions can also not be reached by a rotation of the base body in the process jet or by another relative movement between the process jet and the base body. A coating can also be manufactured using the method in accordance with the invention in those regions which are located in the geometric shadow of the process jet, that is not in the line of sight of the process jet. It is consequently possible to coat around corners, edges and rounded portions with this method.

It is thus, for example, possible that the turbine vanes can be coated not individually, but rather in larger, already assembled clusters.

In a method for the coating of a substrate in which a starting material P is sprayed onto the substrate 10; 50 in the form of a process jet 2 by means of plasma spraying, with the starting material P being injected into a plasma which defocuses the process jet 2 and being melted partly or completely into a liquid phase 21 there at a low process pressure which is at most 20,000 Pa, a gas flow for the process jet 2 is set such that the substrate 10; 50 is coated by deposition from the liquid phase 21 in at least one region 101 which is located in the geometric shadow with respect to the process jet 2.

The invention claimed is:

1. A method of coating a substrate utilizing a thin film low pressure plasma spraying (LPPS-TF) process, the method comprising:
injecting a starting material into a process jet so that the starting material is changed partly or completely into one of a liquid phase or a plasticized phase in the process jet; and
depositing, at least one region of the substrate located in a geometric shadow relative to the process jet, the liquid phase or the plasticized phase of the starting material in the form of a coating,
wherein, during the depositing, at least the following parameters are utilized:
the starting material contains a metallic matrix or a metal alloy;
a process pressure is between 50 and 20,000 Pa;
a temperature of the starting material in the process jet is lower than a boiling point temperature of the metallic matrix or the metal alloy; and
a gas flow of the process jet is set so that the coating results from deposition of the liquid phase or the plasticized phase of the starting material.

2. The method of claim 1, wherein the process pressure is between 50 Pa and 10,000 Pa.

3. The method of claim 1, wherein m 1, wherein the gas flow of the process jet comprises a total flow rate of between 50 and 200 SLPM.

4. The method of claim 1, wherein, during the depositing, at least the following additional parameter is utilized:
a spraying distance between a discharge nozzle of the process jet and the substrate is between one of:
50 mm and 1500 mm;
400 and 1500 mm; and
700 mm and 1000 mm.

5. The method of claim 1, wherein, during the depositing, at least the following additional parameter is utilized:
a starting material supply rate is between 20 g/min and 160 g/min.

6. The method of claim 1, wherein the coating comprises one of:
a corrosion protection layer; and
an erosion protection layer.

7. The method of claim 1, wherein the starting material comprises the metal alloy and the metal alloy of a type MCrAlX, where M stands for nickel (Ni) and/or cobalt (Co) and/or iron (Fe) and X stands for yttrium (Y) and/or zirconium (Zr) and/or hafnium (Hf).

8. The method of claim 1, wherein the coating comprises one of:
a carbide layer;
a tungsten carbide layer;
a chromium carbide layer;
a nickel chromium layer; and
a cobalt chromium layer.

9. The method of claim 1, wherein the coating comprises one of
a nickel chromium layer; and
a nickel chromium carbide layer.

10. The method in of claim 1, wherein the starting material is a sprayable powder comprising one of:
particles which substantially comprise first and second metals and carbon;
a metal which is alloyed with a different metal; and
a metal carbide.

11. The method of claim 1, wherein the starting material is a sprayable powder comprising one of:
chromium;
nickel; and
a metal matric comprising a carbide distributed uniformly in the metal matrix in the form of precipitations.

12. The method of claim 1, wherein the starting material is a sprayable powder comprising particles having a size of between one of:
5 and 50 micrometers; and
10 and 20 micrometers.

13. The method of claim 1, wherein the substrate is a rotary machine rotor.

14. The method of claim 1, wherein the substrate is a pump rotor.

15. A substrate comprising a coating made by the method of claim 1.

16. A method of coating a substrate utilizing a thin film low pressure plasma spraying (LPPS-TF) process, the method comprising:
injecting a starting material into a process jet so that the starting material is changed partly or completely into a liquid phase in the process jet; and
depositing, at least one region of the substrate located in a geometric shadow relative to the process jet, the liquid phase of the starting material in the form of a coating,
wherein, during the depositing, at least the following parameters are utilized:
the starting material contains a metallic component;
a process pressure is between 50 and 10,000 Pa;
a temperature of the starting material in the process jet is lower than a boiling point temperature of the metallic component and vaporization of the metallic component is largely avoided;
a gas flow of the process jet is set so that the coating results from deposition of the liquid phase of the starting material and has a total flow rate of between 50 and 200 SLPM;
a spraying distance between a discharge nozzle of the process jet and the substrate is between 700 mm and 1000 mm; and
a starting material supply rate is between 20 g/min and 160 g/min.

17. The method of claim 16, wherein the substrate is a rotary machine rotor.

18. The method of claim 16, wherein the substrate is a pump rotor.

19. A method of coating a substrate utilizing a thin film low pressure plasma spraying (LPPS-TF) process, the method comprising:
injecting a powder starting material into a process jet so that the starting material is changed partly or completely into a liquid phase in the process jet; and
depositing, at least one region of the substrate located in a geometric shadow relative to the process jet, the liquid phase of the starting material in the form of a coating,
wherein, during the depositing, the substrate is moved and at least the following parameters are utilized:
the powder starting material contains a metal alloy;
a process pressure is between 50 and 10,000 Pa;
a temperature of the starting material in the process jet is lower than a boiling point temperature of the metal alloy and vaporization of the metal alloy is largely avoided;
a gas flow of the process jet is set so that the coating results from deposition of the liquid phase or the plasticized phase of the starting material and has a total flow rate of between 50 and 200 SLPM;

a spraying distance between a discharge nozzle of the process jet and the substrate is between 700 mm and 1000 mm; and a starting material supply rate is between 20 g/min and 160 g/min.

20. The method of claim 19, wherein the substrate is one of:
a rotary machine rotor; and
a pump rotor.

* * * * *